June 26, 1934.  A. ROSNER  1,964,177
MANUFACTURE OF BRAKE LINING
Filed Dec. 21, 1928    2 Sheets-Sheet 1
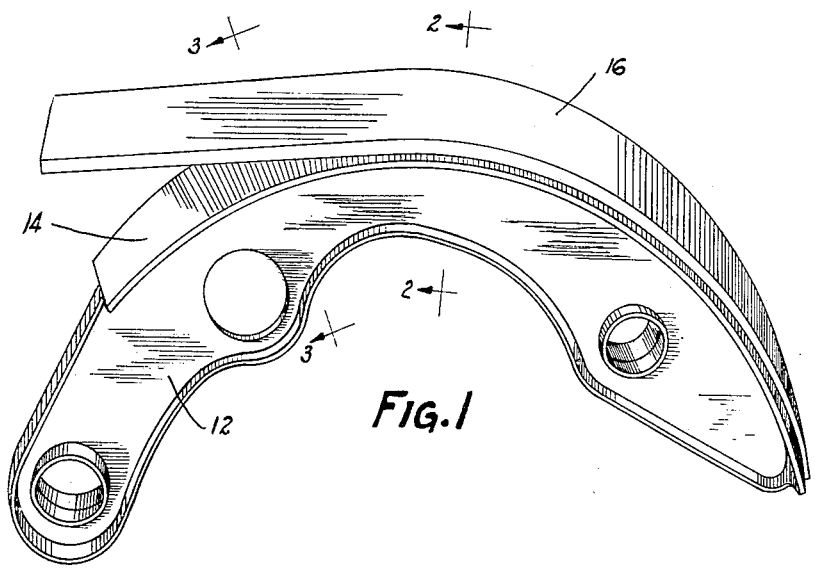
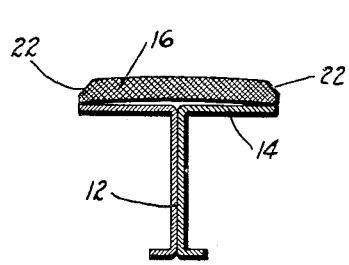
FIG.2
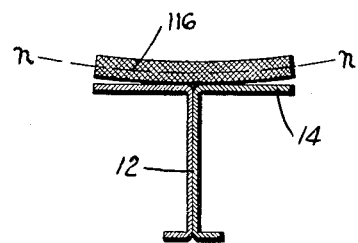
FIG.4
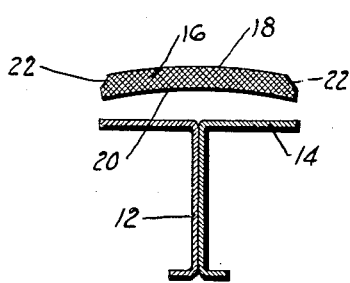
FIG.3
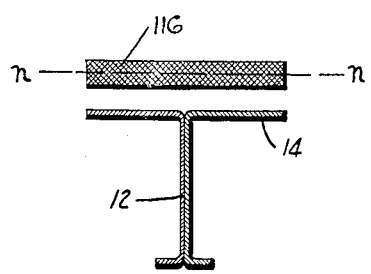
FIG.5
INVENTOR.
ADOLPH ROSNER
BY
ATTORNEY June 26, 1934.  A. ROSNER  1,964,177
MANUFACTURE OF BRAKE LINING
Filed Dec. 21, 1928   2 Sheets-Sheet 2

INVENTOR.
ADOLPH ROSNER
BY *Jn.W. McConkey*
ATTORNEY

Patented June 26, 1934

1,964,177

UNITED STATES PATENT OFFICE 1,964,177

MANUFACTURE OF BRAKE LINING

Adolph Rosner, South Bend, Ind., assignor to Bendix Brake Company, South Bend, Ind., a corporation of Illinois Application December 21, 1928, Serial No. 327,730

8 Claims. (Cl. 18—55)

This invention relates to the manufacture of friction materials such as brake lining, and has for its object the provision of a lining, preferably of the woven type, which will lie flat on the shoe without curling at the edges and which will not stretch or "creep" laterally.

Ordinary brake linings are made flat, and when a strip is curved to be placed on a shoe a set of unbalanced strains is set up which causes the lining to curl away from the shoe at its edges, giving a channel-shaped effect which leaves upturned edges which engage the brake drum before the central portion of the lining. These edges of course wear down somewhat in service, but in so doing the edges of the lining become frayed and ragged, and moreover the lining never entirely overcomes its tendency to curl.

According to one phase of the present invention, the lining is formed so that, when a strip of it is straightened out, it is transversely concave. The upper and lower faces of the lining are preferably on parallel arcs, and the concave side is toward the brake shoe. When a strip of this lining is bent to be placed on a shoe, it flattens out transversely, so that it lies flat against the shoe with no tendency to curl.

I prefer to make the transverse curvature slightly greater than would cause the lining to become exactly straight transversely when so bent longitudinally so that there is still a slight concavity facing toward the shoe; then when the rivets or other fastenings draw the lining tightly against the shoe the side edges are drawn down under tension and hug the shoe all the more closely.

In order to make sure that there will not be any ragged or frayed edges as the lining wears, I also prefer to bevel the side edges of the lining.

Another trouble with ordinary brake linings is their tendency to stretch or "creep" transversely in service, so that they overhang the shoe and give a ragged and unworkmanlike appearance, as well as being diminished in effectiveness by the extent of the unsupported lining. According to an important phase of my invention, I secure the above-described improvements in the lining by a novel method of manufacture which eliminates this "creeping" by giving what is in effect a prestretched lining.

I consider that the tendency to stretch is due to the fact that heretofore the lining has always been made initially wider as well as thicker than the finished lining is to be, and is then rolled or otherwise compressed transversely as well as for thickness. This introduces considerable looseness into the transverse elements or "filler" of the weave, so that ordinary braking pressure in use readily causes the lining to flow or "creep" transversely.

In order to avoid this, I weave or otherwise form the lining thicker but narrower than it is finally to be, and then roll or otherwise compress it to the correct thickness with its edges unsupported and free to flow outwardly to size, thus taking out all the stretch and in fact leaving the transverse elements set under tension. Preferably the side of the lining flows outwardly into a convergent space, thus forming the above-described bevel. The rolls or other compressing devices also of course can be formed to give the lining the desired transverse curvature.

The above and other objects and advantages of the invention, including various novel details of structure and of procedure, will be apparent from the following description of the method illustrated in the accompanying drawings, in which:

Figure 1 is a diagrammatic perspective view of a brake shoe, with the lining partly in place on the shoe and partly extending straight outwardly at a tangent to the shoe;

Figure 2 is a section through the shoe and lining, on the line 2—2 of Figure 1, at a point where the lining rests against the shoe;

Figure 3 is a section, on the line 3—3 of Figure 1, through the shoe and a straight portion of the lining;

Figures 4 and 5 are sections corresponding respectively to Figures 2 and 3 but showing ordinary brake lining;

Figure 6:
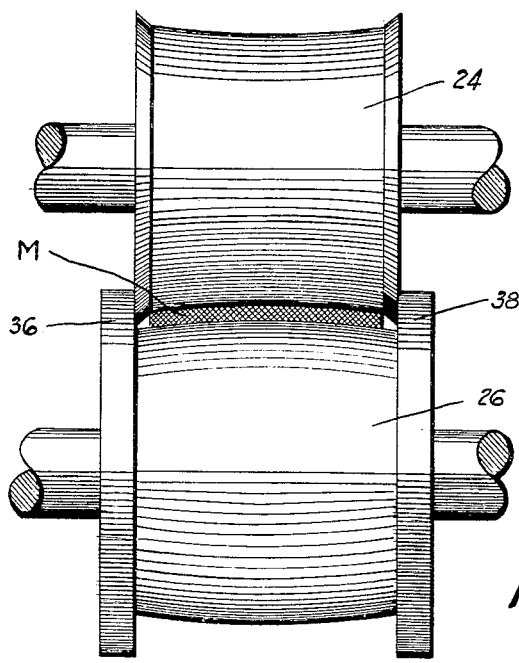
Figure 6 is a diagrammatic view showing the compressing of the lining to size between a pair of novel rolls.

In the drawings, the character 12 indicates a well-known form of rigid brake shoe (although the invention is not necessarily limited to rigid shoes) having a cylindrically-curved friction face 14 on which the brake lining 16 or 116 is riveted or otherwise secured.

As shown in Figures 4 and 5, ordinary brake lining 116 is made straight transversely when it extends straight longitudinally (Figure 5). If now the lining is bent into an arc longitudinally to be placed on a shoe or the like, as shown in Figure 4, there is a tendency to compress the lower portion (i. e. the portion below a neutral central plane N—N lengthwise through the lining) and to stretch the upper portion (i. e. the portion above the plane N—N). At the opposite sides of the lining these opposite forces are not balanced, and cause the lining to curl transversely, away from the shoe. As explained above, this soon results in frayed and ragged edges, as it is impossible to place the rivets in such a manner as to pull the lining entirely flat against the shoe.

According to my invention, the lining 16, when straight (Figure 3), has upper and lower transversely-curved parallel faces 18 and 20, so that the lining as a whole is concave, with the concave side facing toward the shoe. When this lining is bent on an arc against the shoe, as in Figure 2, it straightens out transversely, or substantially so, and lies flat against the shoe.

I prefer, however, to make the curvature slightly greater than that necessary to cause the desired flattening out, so that there is still a very shallow concavity facing toward the shoe, so that when the lining is drawn tightly against the face 14 by the rivets or their equivalent the outer edges of the lining will be tensioned against the shoe and will hug tightly against the shoe to form a very close joint.

In order to make certain that there will not be any fraying at the edges, I also prefer to bevel the upper edges (i. e. the edges away from the shoe) as shown at 22.

As shown in Figure 6, the lining may be formed as described above by being compressed between devices such as novel rolls 24 and 26. I prefer also to take advantage of this step in the manufacture of the lining to secure the above-described pre-stretching of the lining.

Figure 7:
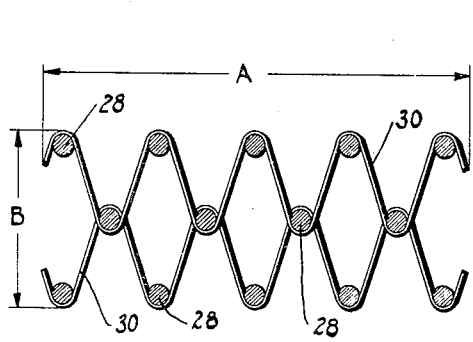
Figure 7 is a diagrammatic section showing the arrangement of the longitudinal and transverse elements of the weave of a piece of lining before it is compressed.

In Figure 7 I show diagrammatically and on an enlarged scale a small piece of lining just after the weaving of the fabric (either before or after impregnation, which is a step that may take place at any time before or after compressing the lining, according to the particular method of manufacture). In this diagram the longitudinal elements are shown in section at 28, these usually being a copper-wire and asbestos yarn, and the transverse elements or filler (of the same material) are shown in elevation at 30 weaving in and out among the elements 28 in the usual manner.

Figure 8:
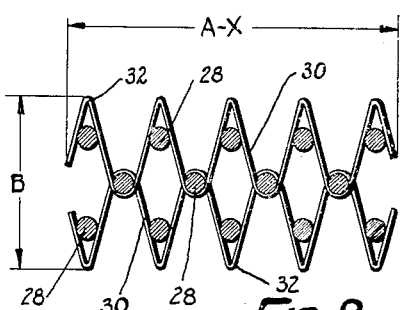
Figure 8 shows what would happen if it were compressed laterally only.
Figure 9:
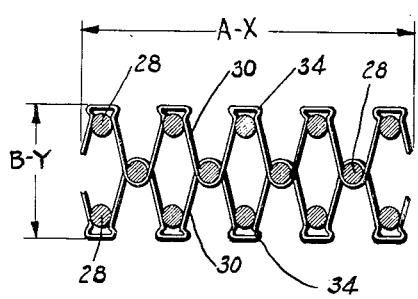
Figure 9 shows what happens when it is compressed both laterally and for thickness.

Ordinarily this material has a width "$a$" which is greater than the final width desired, and a thickness "$b$" which is greater than the final thickness desired, and the next step would be to compress it both transversely and for thickness to a desired width "$a-x$" and a desired thickness "$b-y$". If the compression transversely took place first, and the compression for thickness as a second step, Figures 8 and 9 show what would happen. First (Figure 8) the transverse compression would elongate the vertical loops of elements 30, leaving clearances 32 about the elements 28. Next (Figure 9) these loops would be flattened out at 34, giving broad transverse loops loosely embracing the elements 28. Substantially the same thing happens in the usual step of combining the transverse compression with the compression for thickness. It will be seen that this gives a final material which has a diminished tensile strength transversely, and which readily flows or "creeps" transversely in use.

Figure 10:
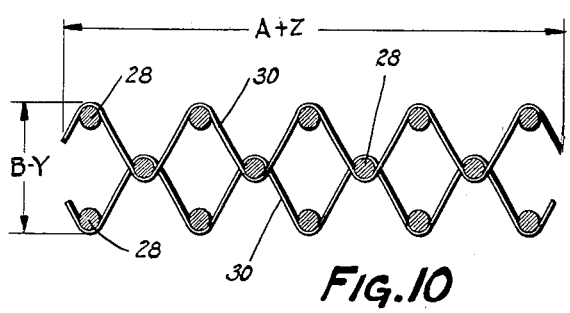
Figure 10 shows what happens when the same lining is compressed, according to my method, with its side edges unsupported.

As shown in Figure 10, I prefer to compress to the desired final thickness "$b-y$" without confining or restraining the material laterally, but in fact facilitating the lateral flow of the material during the compression. To this end, I take a piece of material which is thicker but narrower than the desired final product, and while compressing it from the thickness "$b$" to "$b-y$", it is allowed to stretch or flow laterally from a width "$a$" to a greater width "$a+z$". It will at once be apparent that this "sets" the transverse elements 30 under tension, so that there is if anything a negative tendency to stretch, and since the resulting pre-stretched fabric will never in ordinary use again be compressed to such a high degree, it will never tend to stretch or "creep" transversely.

As illustrated in Figure 6, I prefer that the transverse flowing of the material "M" of Figure 7 should take place into convergent spaces 36 and 38, to form the above-described bevels 22. Rolls 24 and 26 also have parallel curved pressure surfaces, to curve the lining transversely, as explained above.

Features disclosed but not claimed herein are being claimed in my copending application Serial No. 707,654, filed January 22, 1934.

While certain structures and certain steps have been described in detail, it is not my intention to limit the scope of my invention by that description, or otherwise than by the terms of the appended claims.

I claim:

1. That method of manufacturing brake lining or the like which comprises rolling a long straight strip of woven lining to give it a transverse curvature with its side edges unconfined laterally so that it may flow laterally to give a finished product which is substantially non-stretchable laterally when in use.

2. That method of manufacturing brake lining or the like which comprises rolling a long straight strip of woven lining to give it a transverse curvature with its side edges unconfined laterally but restricted as to thickness so that it may flow laterally into convergent side spaces to give a finished product which is substantially non-stretchable laterally when in use and which has beveled edges.

3. That method of manufacturing brake lining or the like which comprises compressing a long strip of woven material with its side edges unconfined laterally but restricted as to thickness so that the lining may flow laterally into convergent side spaces to give a finished product which is substantially non-stretchable laterally when in use and which has beveled edges.

4. That method of manufacturing brake lining or the like which comprises compressing a long strip of flexible woven material with its side edges unconfined laterally so that the lining may flow laterally to give a finished product which is substantially non-stretchable laterally when in use.

5. That method of manufacturing brake lining or the like which comprises forming a long strip of woven material over-size as to thickness and under-size as to width, and then compressing the lining to the desired thickness while it is free to flow laterally to stretch out to the width required in a brake lining or the like.

6. That method of manufacturing brake lining or the like which comprises weaving a long strip of material over-size as to thickness and under-size as to width, and then compressing the lining to the desired thickness while it is free to flow laterally to the proper width for a brake lining or the like with the transverse woven elements under tension.

7. That method of manufacturing brake lining or the like which comprises forming a long strip of material with longitudinal elements and transversely-extending metallic wires interwoven with the longitudinal elements, and then tensioning said wires to impart a predetermined shape to them while compressing the lining to reduce its thickness.

8. That method of manufacturing brake lining or the like which comprises forming a long strip of material with longitudinal elements and substantially non-stretchable transversely-extending filler elements interwoven with the longitudinal elements, and then subjecting said elements to tension in the direction of their length while compressing the lining to reduce it to the thickness desired in the brake lining or the like.

ADOLPH ROSNER.